(12) United States Patent
Park et al.

(10) Patent No.: US 12,277,934 B2
(45) Date of Patent: Apr. 15, 2025

(54) ELECTRONIC DEVICE FOR ANALYZING DOMAIN ASSOCIATIONS AND RECONSTRUCTING HINTS CUSTOMIZED FOR A USER BASED ON A COMMON PARAMETER

(71) Applicant: SAMSUNG ELECTRONICS CO., LTD., Suwon-si (KR)

(72) Inventors: Suneung Park, Suwon-si (KR); Sanghee Kim, Suwon-si (KR); Hyunju Seo, Suwon-si (KR); Soojeong Eom, Suwon-si (KR); Jaeyung Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 387 days.

(21) Appl. No.: 17/670,816

(22) Filed: Feb. 14, 2022

(65) Prior Publication Data

US 2022/0262359 A1 Aug. 18, 2022

Related U.S. Application Data

(63) Continuation of application No. PCT/KR2022/001902, filed on Feb. 8, 2022.

(30) Foreign Application Priority Data

Feb. 17, 2021 (KR) .................... 10-2021-0020932

(51) Int. Cl.
*G10L 15/22* (2006.01)
*G06F 3/16* (2006.01)
(Continued)

(52) U.S. Cl.
CPC ................ *G10L 15/22* (2013.01); *G06F 3/16* (2013.01); *G10L 15/08* (2013.01); *G10L 25/30* (2013.01);
(Continued)

(58) Field of Classification Search
CPC ......... G10L 15/22; G10L 15/08; G10L 25/30; G10L 2015/223; G06F 3/16; G06F 3/0488
See application file for complete search history.

(56) References Cited

U.S. PATENT DOCUMENTS 9,070,366 B1 * 6/2015 Mathias .................. G10L 15/22
10,325,595 B2 6/2019 Chen et al.
(Continued)

FOREIGN PATENT DOCUMENTS

JP 2018-132754 8/2018
KR 10-2016-0059026 5/2016
(Continued)

*Primary Examiner* — Bhavesh M Mehta
*Assistant Examiner* — Nandini Subramani
(74) *Attorney, Agent, or Firm* — NIXON & VANDERHYE P.C.

(57) ABSTRACT

Disclosed is an electronic device. According to an embodiment, an electronic device may include: a user interface comprising interface circuitry, a processor, and a memory operatively connected to the processor. The memory may store instructions that, when executed, cause the processor to: receive an input through the user interface, analyze a domain association for at least one or more domains included in the electronic device or operatively connected to the electronic device in response to the input, collect at least one hint defined in the at least one or more domains, identify a common parameter for the collected at least one hint, to reconstruct the hint using the identified common parameter, and provide response data including the reconstructed hint, using the user interface.

10 Claims, 10 Drawing Sheets

(51) Int. Cl.
G10L 15/08 (2006.01)
G10L 25/30 (2013.01)
*G06F 3/0488* (2022.01)

(52) U.S. Cl.
CPC ...... *G06F 3/0488* (2013.01); *G10L 2015/223* (2013.01)

(56) References Cited

U.S. PATENT DOCUMENTS

| | | | |
|---|---|---|---|
| 10,515,625 | B1 * | 12/2019 | Metallinou ......... G10L 15/1822 |
| 10,635,698 | B2 | 4/2020 | Papangelis et al. |
| 10,726,840 | B2 | 7/2020 | Chen et al. |
| 10,885,900 | B2 * | 1/2021 | Li ........................... G10L 25/30 |
| 11,140,450 | B2 | 10/2021 | Yelton |
| 11,145,290 | B2 | 10/2021 | Kim et al. |
| 11,302,310 | B1 * | 4/2022 | Gandhe ................. G10L 15/197 |
| 2017/0193997 | A1 | 7/2017 | Chen et al. |
| 2019/0188319 | A1 * | 6/2019 | Anerousis ............. G06F 16/367 |
| 2019/0340202 | A1 * | 11/2019 | Kandur Raja ........ G06F 40/274 |
| 2022/0036882 | A1 | 2/2022 | Ahn et al. |

FOREIGN PATENT DOCUMENTS

| | | |
|---|---|---|
| KR | 10-1683083 | 12/2016 |
| KR | 10-2019-0134107 | 12/2019 |
| KR | 10-2020-0034430 | 3/2020 |
| KR | 10-2020-0091462 | 8/2020 |

* cited by examiner

ELECTRONIC DEVICE FOR ANALYZING DOMAIN ASSOCIATIONS AND RECONSTRUCTING HINTS CUSTOMIZED FOR A USER BASED ON A COMMON PARAMETER

CROSS-REFERENCE TO RELATED APPLICATIONS

This application is a continuation of International Application No. PCT/KR2022/001902 designating the United States, filed on Feb. 8, 2022, in the Korean Intellectual Property Receiving Office and claiming priority to Korean Patent Application No. 10-2021-0020932, filed on Feb. 17, 2021, in the Korean Intellectual Property Office, the disclosures of which are incorporated by reference herein in their entireties.

BACKGROUND

Field

The disclosure relates to an electronic device and an operating method thereof.

Description of Related Art

Nowadays, with the development of artificial intelligence (AI) technology, terminals including AI used for the main purpose of assistant are spread. Users naturally give various commands to the AI included in the terminal, or have a conversation with the AI. The assistant is trying to improve usability by continuously providing a user with a recommendation input.

However, conventional assistants may only describe their role for each domain and may suggest a predefined recommendation input that does not reflect the user's usability. Accordingly, the conventional assistants may not be helpful to real users. As a result, there is an increasing need to provide a recommendation input on a screen at an appropriate time.

SUMMARY

Embodiments of the disclosure provide a method and device for providing personalized hints.

Embodiments of the disclosure provide a method and device for providing a hint reconstructed based on a user input.

Embodiments of the disclosure provide a method and device for providing hints reconstructed based on a user's usage pattern.

Embodiments of the disclosure provide a method and device for providing users with a consistent user experience by providing hints reconstructed by grasping an association relationship between domains.

According to an example embodiment of the disclosure, an electronic device may include: a user interface comprising interface circuitry, a processor, and a memory operatively connected to the processor. The memory may store instructions that, when executed, cause the processor to: receive an input through the user interface, analyze a domain association for at least one or more domains included in the electronic device or operatively connected to the electronic device in response to the input, collect at least one hint defined in the at least one or more domains, identify a common parameter for the collected at least one hint, reconstruct the hint using the identified common parameter, and provide response data including the reconstructed hint, using the user interface.

According to an example embodiment of the disclosure, a method performed by an electronic device may include: receiving an input based on a process for a memory included in the electronic device or connected to the electronic device being executed, analyzing a domain association for at least one or more domains included in the electronic device or operatively connected to the electronic device in response to the input, collecting at least one hint defined in the at least one or more domains, identifying a common parameter for the collected at least one hint, reconstructing the hint using the identified common parameter, and providing response data including the reconstructed hint, using the user interface.

According to various example embodiments, it is possible to provide a method and device for providing a hint reconstructed based on a user's usage pattern.

According to various example embodiments, it is possible to provide a method and device for providing personalized hints by grasping a correlation between domains and then reconstructing hints.

According to various example embodiments, it is possible to provide a method and device for providing users with a consistent user experience by providing reconstructed hints.

Besides, a variety of effects directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar components will be marked by the same or similar reference signs.

DETAILED DESCRIPTION

Hereinafter, various example embodiments of the disclosure are described with reference to the attached drawings. However, this is not intended to limit the disclosure to specific embodiments, and it should be understood that various modifications, equivalents, and/or alternatives of the various example embodiments are included.

Figure 1:
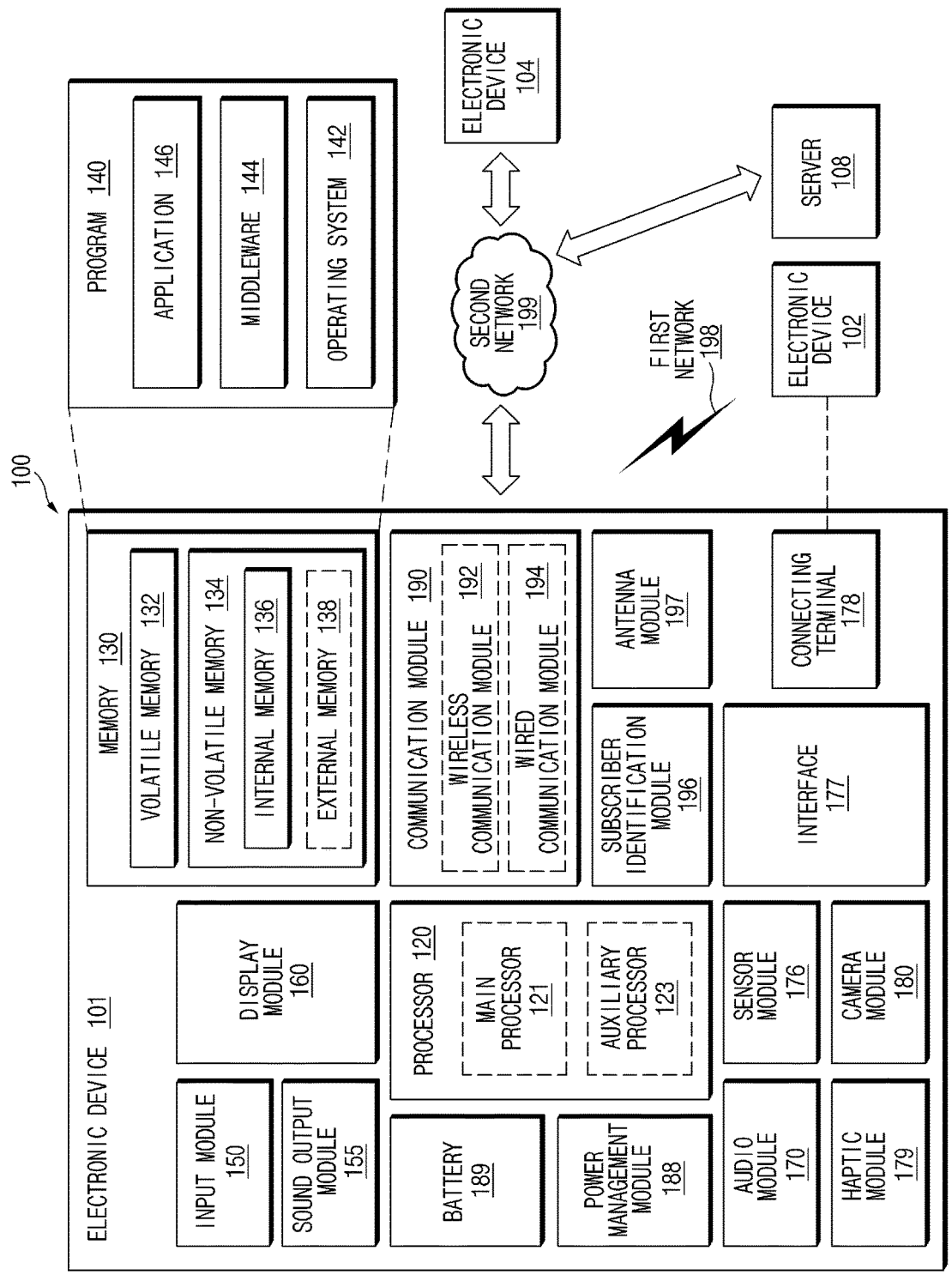
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
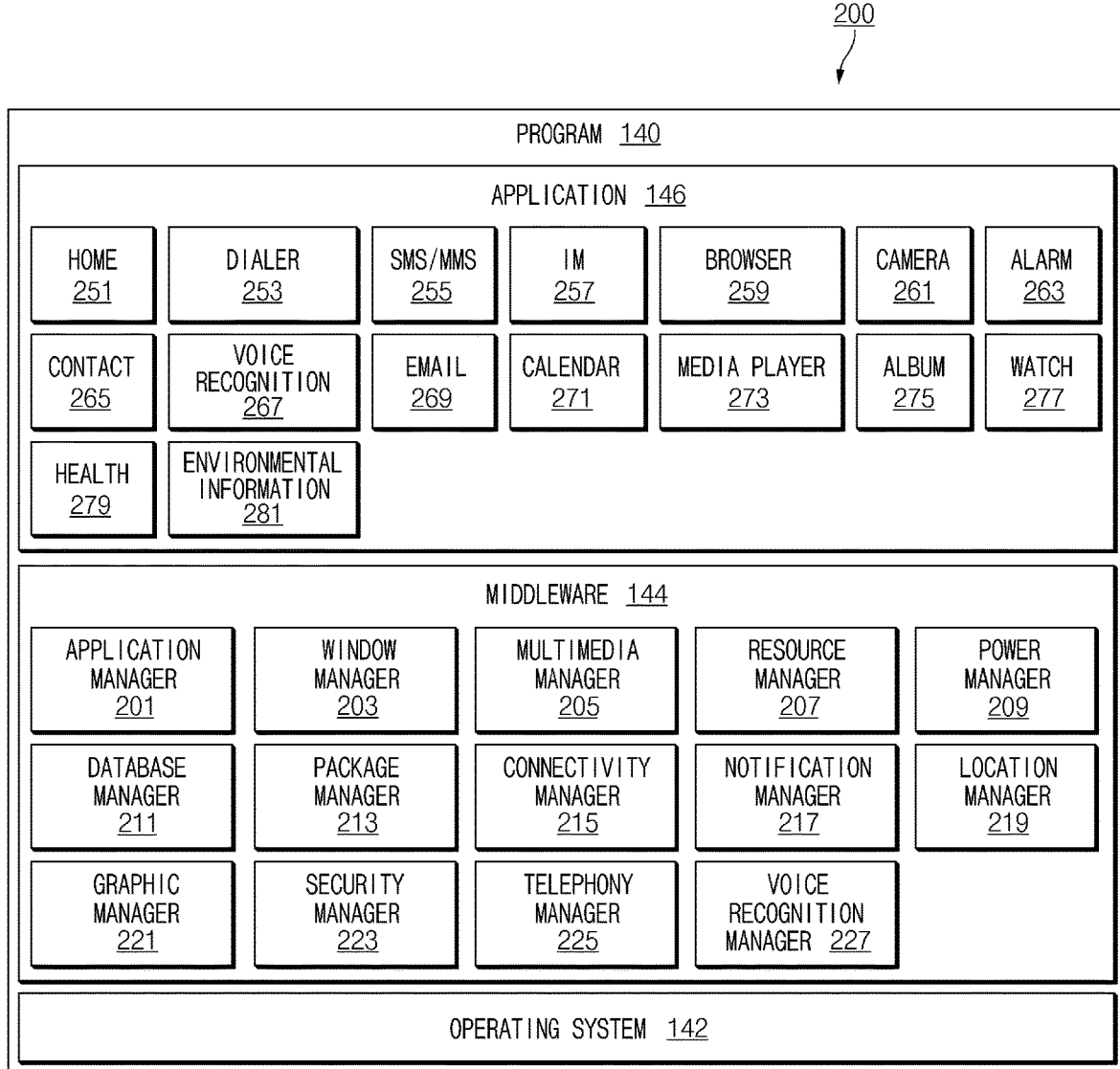
FIG. 2 is a block diagram of an example program, according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bath™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
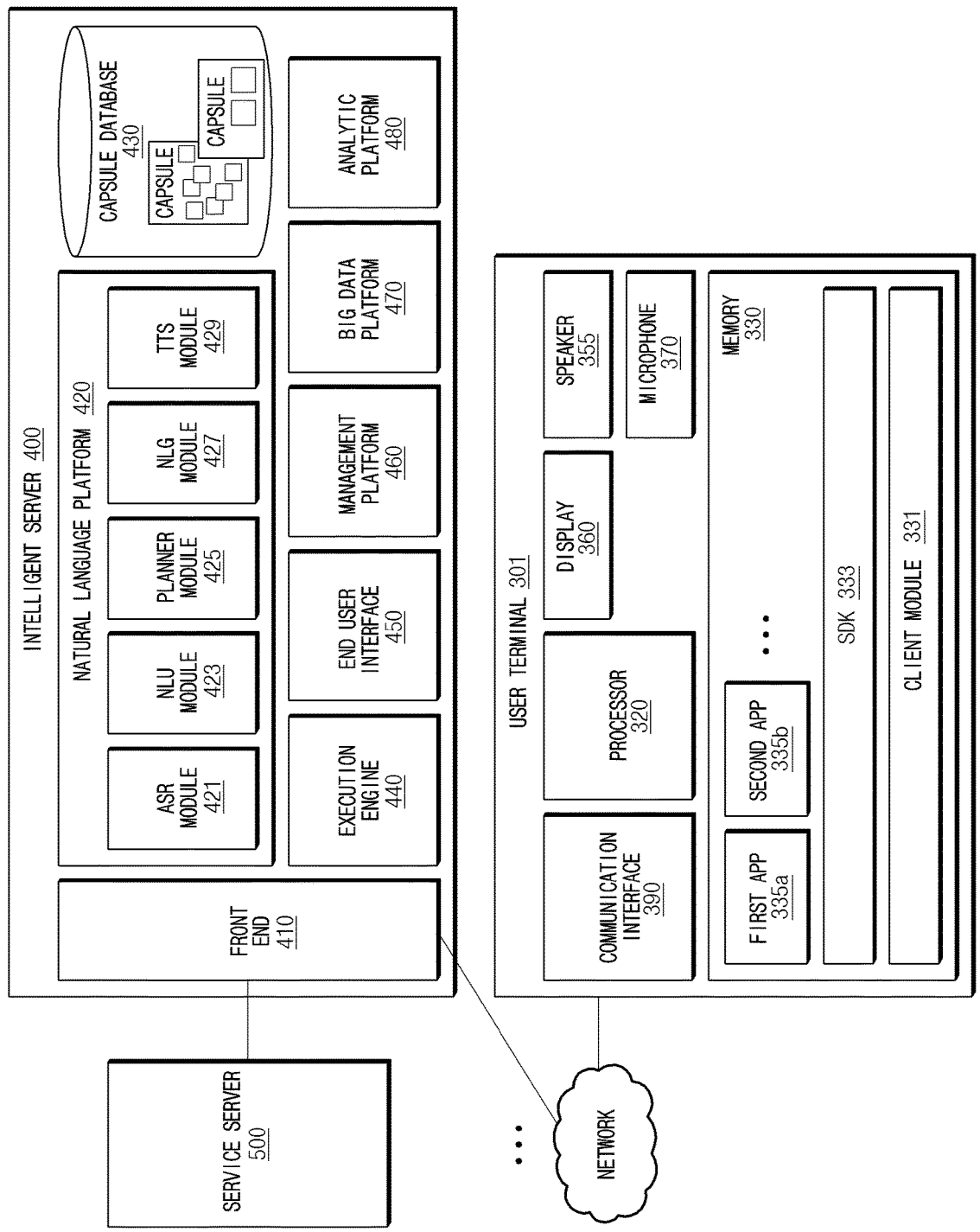
FIG. 3 is a block diagram illustrating an integrated intelligence system, according to various embodiments.

FIG. 3 is a block diagram illustrating an example integrated intelligence system, according to various embodiments.

Referring to FIG. 3, an integrated intelligence system according to an embodiment may include a user terminal 301, an intelligence server 400, and a service server 500.

The user terminal 301 according to an embodiment may be a terminal device (or an electronic device) capable of connecting to Internet, and may be, for example, a mobile phone, a smartphone, a personal digital assistant (PDA), a notebook computer, a television (TV), a white household appliance, a wearable device, a head mounted display (HMD), or a smart speaker.

According to the illustrated embodiment, the user terminal 301 may include a communication interface (e.g., including communication circuitry) 390, a microphone 370, a speaker 355, a display 360, a memory 330, and/or a processor (e.g., including processing circuitry) 320. The listed components may be operatively or electrically connected to one another.

The communication interface 390 according to an embodiment may be connected to an external device and may be configured to transmit or receive data to or from the external device. The microphone 370 according to an embodiment may receive a sound (e.g., a user utterance) to convert the sound into an electrical signal. The speaker 355 according to an embodiment may output the electrical signal as sound (e.g., voice). The display 360 according to an embodiment may be configured to display an image or a video. The display 293 according to an embodiment may display the graphic user interface (GUI) of the running app (or an application program).

The memory 330 according to an embodiment may store a client module 331, a software development kit (SDK) 333, and a plurality of apps 335. The client module 331 and the SDK 333 may include a framework (or a solution program) for performing general-purposed functions. Furthermore, the client module 331 or the SDK 333 may include the framework for processing a voice input.

The plurality of apps 335 may be programs for performing a specified function. According to an embodiment, the plurality of apps 335 may include a first app 335a and/or a second app 335b. According to an embodiment, each of the plurality of apps 335 may include a plurality of actions for performing a specified function. For example, the apps may include an alarm app, a message app, and/or a schedule app. According to an embodiment, the plurality of apps 335 may be executed by the processor 320 to sequentially execute at least part of the plurality of actions.

According to an embodiment, the processor 320 may control overall operations of the user terminal 301. For example, the processor 320 may be electrically connected to the communication interface 390, the microphone 370, the speaker 355, and the display 360 so as to perform a specified operation. For example, the processor 320 may include at least one processor.

Moreover, the processor 320 according to an embodiment may execute the program stored in the memory 330 so as to perform a specified function. For example, according to an embodiment, the processor 320 may execute at least one of the client module 331 or the SDK 333 so as to perform a following operation for processing a voice input. The processor 320 may control operations of the plurality of apps 335 via the SDK 333. The following actions described as the actions of the client module 331 or the SDK 333 may be the actions performed by the execution of the processor 320.

According to an embodiment, the client module 331 may receive a voice input. For example, the client module 331 may receive a voice signal corresponding to a user utterance detected through the microphone 370. The client module 331 may transmit the received voice input (e.g., a voice signal) to the intelligence server 400. The client module 331 may transmit state information of the user terminal 301 to the intelligence server 400 together with the received voice input. For example, the state information may be execution state information of an app.

According to an embodiment, the client module 331 may receive a result corresponding to the received voice input. For example, when the intelligence server 400 is capable of calculating the result corresponding to the received voice input, the client module 331 may receive the result corresponding to the received voice input. The client module 331 may display the received result on the display 360.

According to an embodiment, the client module 331 may receive a plan corresponding to the received voice input. The client module 331 may display, on the display 360, a result of executing a plurality of actions of an app depending on the plan. For example, the client module 331 may sequentially display the result of executing the plurality of actions on a display. For another example, the user terminal 301 may display only a part of results (e.g., a result of the last action) of executing the plurality of actions, on the display.

According to an embodiment, the client module 331 may receive a request for obtaining information necessary to calculate the result corresponding to a voice input, from the intelligence server 400. According to an embodiment, the client module 331 may transmit the necessary information to the intelligence server 400 in response to the request.

According to an embodiment, the client module 331 may transmit, to the intelligence server 400, information about the result of executing a plurality of actions depending on the plan. The intelligence server 400 may identify that the received voice input is correctly processed, using the result information.

According to an embodiment, the client module 331 may include a speech recognition module. According to an embodiment, the client module 331 may recognize a voice input for performing a limited function, via the speech recognition module. For example, the client module 331 may launch an intelligence app for processing a specific voice input by performing an organic action, in response to a specified voice input (e.g., wake up!).

According to an embodiment, the intelligence server 400 may receive information associated with a user's voice input from the user terminal 301 over a communication network. According to an embodiment, the intelligence server 400 may convert data associated with the received voice input to text data. According to an embodiment, the intelligence server 400 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 400 may transmit a result according to the generated plan to the user terminal 301 or may transmit the generated plan to the user terminal 301. According to an embodiment, the user terminal 301 may display the result according to the plan, on a display. According to an embodiment, the user terminal 301 may display a result of executing the action according to the plan, on the display.

The intelligence server 400 according to an embodiment may include a front end 410, a natural language platform 420, a capsule database 430, an execution engine 440, an end user interface 450, a management platform 460, a big data platform 470, or an analytic platform 480.

According to an embodiment, the front end 410 may receive a voice input received from the user terminal 300. The front end 410 may transmit a response corresponding to the voice input to the user terminal 301.

According to an embodiment, the natural language platform 420 may include an automatic speech recognition (ASR) module 421, a natural language understanding (NLU) module 423, a planner module 425, a natural language generator (NLG) module 427, and/or a text to speech module (TTS) module 429. Each of these modules may include various processing circuitry and/or executable program instructions.

According to an embodiment, the ASR module 421 may convert the voice input received from the user terminal 301 into text data. According to an embodiment, the NLU module 423 may grasp the intent of the user, using the text data of the voice input. For example, the NLU module 423 may grasp the intent of the user by performing syntactic analysis or semantic analysis. According to an embodiment, the NLU module 423 may grasp the meaning of words extracted from the voice input using linguistic features (e.g., syntactic elements) such as morphemes or phrases and may determine the intent of the user by matching the grasped meaning of the words to the intent.

According to an embodiment, the planner module 425 may generate the plan using a parameter and the intent that is determined by the NLU module 423. According to an embodiment, the planner module 425 may determine a plurality of domains necessary to perform a task, based on the determined intent. The planner module 425 may determine a plurality of actions included in each of the plurality of domains determined based on the intent. According to an embodiment, the planner module 425 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 425 may determine the relationship between the plurality of actions and the plurality of concepts stepwise (or hierarchically). For example, the planner module 425 may determine the execution sequence of the plurality of actions, which are determined based on the user's intent, based on the plurality of concepts. In other words, the planner module 425 may determine an execution sequence of the plurality of actions, based on the parameters necessary to perform the plurality of actions and the result output by the execution of the plurality of actions. Accordingly, the planner module 425 may generate a plan including information (e.g., ontology) about the relationship between the plurality of actions and the plurality of concepts. The planner module 425 may generate the plan, using information stored in the capsule DB 430 storing a set of relationships between concepts and actions.

According to an embodiment, the NLG module 427 may change specified information into information in a text form. The information changed to the text form may be in the form of a natural language speech. The TTS module 429 according to an embodiment may change information in the text form to information in a voice form.

According to an embodiment, all or part of the functions of the natural language platform 420 may be also implemented in the user terminal 301.

The capsule DB 430 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 430 may store the plurality of capsules in a form of a concept action network (CAN). According to an embodiment, the plurality of capsules may be stored in the function registry included in the capsule DB 430.

The capsule DB 430 may include a strategy registry that stores strategy information necessary to determine a plan corresponding to a voice input. When there are a plurality of plans corresponding to the voice input, the strategy information may include reference information for determining one plan. According to an embodiment, the capsule DB 430 may include a follow-up registry that stores information of the follow-up action for suggesting a follow-up action to the user in a specified context. For example, the follow-up action may include a follow-up utterance. According to an embodiment, the capsule DB 430 may include a layout registry storing layout information of information output via the user terminal 301. According to an embodiment, the capsule DB 430 may include a vocabulary registry storing vocabulary information included in capsule information. According to an embodiment, the capsule DB 430 may include a dialog registry storing information about dialog (or interaction) with the user. The capsule DB 430 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 430 according to an embodiment may be also implemented in the user terminal 301.

According to an embodiment, the execution engine 440 may calculate a result using the generated plan. The end user interface 450 may transmit the calculated result to the user terminal 301. Accordingly, the user terminal 301 may receive the result and may provide the user with the received result. According to an embodiment, the management platform 460 may manage information used by the intelligence server 400. According to an embodiment, the big data platform 470 may collect data of the user. According to an embodiment, the analytic platform 480 may manage quality of service (QoS) of the intelligence server 400. For example, the analytic platform 480 may manage the component and processing speed (or efficiency) of the intelligence server 400.

According to an embodiment, the service server 500 may provide the user terminal 301 with a specified service (e.g., ordering food or booking a hotel). According to an embodiment, the service server 500 may be a server operated by the third party. According to an embodiment, the service server 500 may provide the intelligence server 400 with information for generating a plan corresponding to the received voice input. The provided information may be stored in the capsule DB 430. Furthermore, the service server 500 may provide the intelligence server 400 with result information according to the plan.

In the above-described integrated intelligence system, the user terminal 301 may provide the user with various intelligent services in response to a user input. The user input may include, for example, an input through a physical button, a touch input, or a voice input.

According to an embodiment, the user terminal 301 may provide a speech recognition service via an intelligence app (or a speech recognition app) stored therein. In this case, for example, the user terminal 301 may recognize a user utterance or a voice input, which is received via the microphone, and may provide the user with a service corresponding to the recognized voice input.

According to an embodiment, the user terminal 301 may perform a specified action, based on the received voice input, independently, or together with the intelligence server and/or the service server. For example, the user terminal 301 may launch an app corresponding to the received voice input and may perform the specified action via the executed app.

According to an embodiment, when providing a service together with the intelligence server 400 and/or the service server 500, the user terminal 301 may detect a user utterance using the microphone 370 and may generate a signal (or voice data) corresponding to the detected user utterance. The user terminal may transmit the voice data to the intelligence server 400 using the communication interface 390.

According to an embodiment, the intelligence server 400 may generate a plan for performing a task corresponding to the voice input or the result of performing an action depending on the plan, as a response to the voice input received from the user terminal 301. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and/or the plurality of concepts.

According to an embodiment, the user terminal 301 may receive the response using the communication interface 390. The user terminal 301 may output the voice signal generated in the user terminal 301 to the outside using the speaker 355 or may output an image generated in the user terminal 301 to the outside using the display 360.

Figure 4:
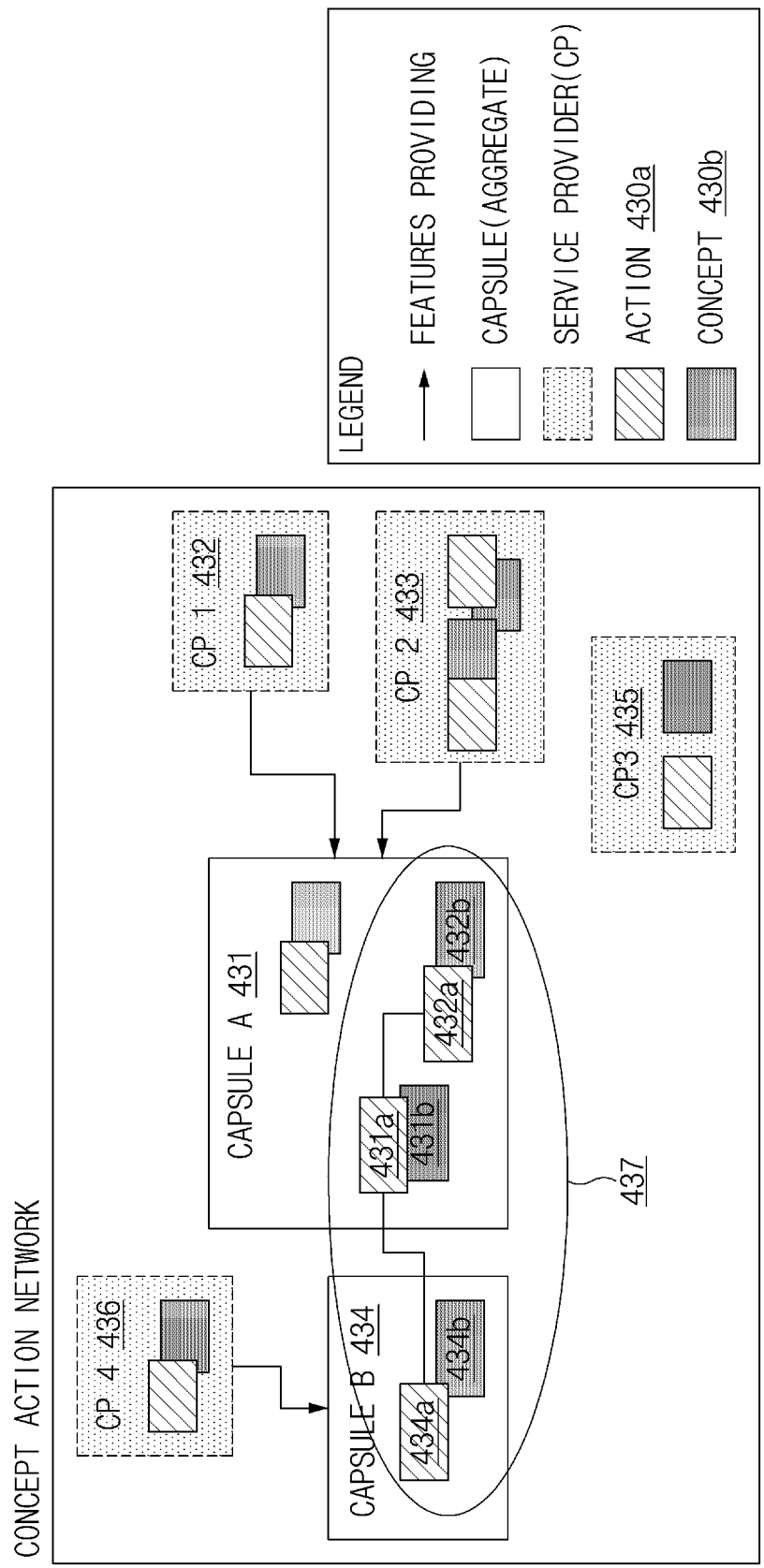
FIG. 4 is a diagram illustrating an example in which relationship information between a concept and an action is stored in a database, according to various embodiments.

FIG. 4 is a diagram illustrating an example of relationship information between a concept and an action stored in a database, according to various embodiments.

A capsule database (e.g., the capsule DB 430) of the intelligence server 400 may store a capsule in the form of a CAN. The capsule DB may store an action for processing a task corresponding to a user's voice input and a parameter necessary for the action, in a form of CAN.

The capsule DB may store a plurality capsules (a capsule A 431 and a capsule B 434) respectively corresponding to a plurality of domains (e.g., applications). According to an embodiment, a single capsule (e.g., the capsule A 431) may correspond to a single domain (e.g., a location (geo) or an application). Furthermore, at least one service provider (e.g., CP 1 432, CP 2 433, CP 3 435 or CP 4 436) for performing a function for a domain associated with the capsule may correspond to one capsule. According to an embodiment, the single capsule may include at least one or more actions 430*a* and at least one or more concepts 430*b* for performing a specified function.

The natural language platform 420 may generate a plan for performing a task corresponding to the received voice input, using the capsule stored in a capsule database. For example, the planner module 425 of the natural language platform may generate the plan using the capsule stored in the capsule database. For example, a plan 407 may be generated using actions 431*a* and 432*a* and concepts 431*b* and 432*b* of the capsule A 431 and an action 434*a* and a concept 434*b* of the capsule B 434.

Figure 5:
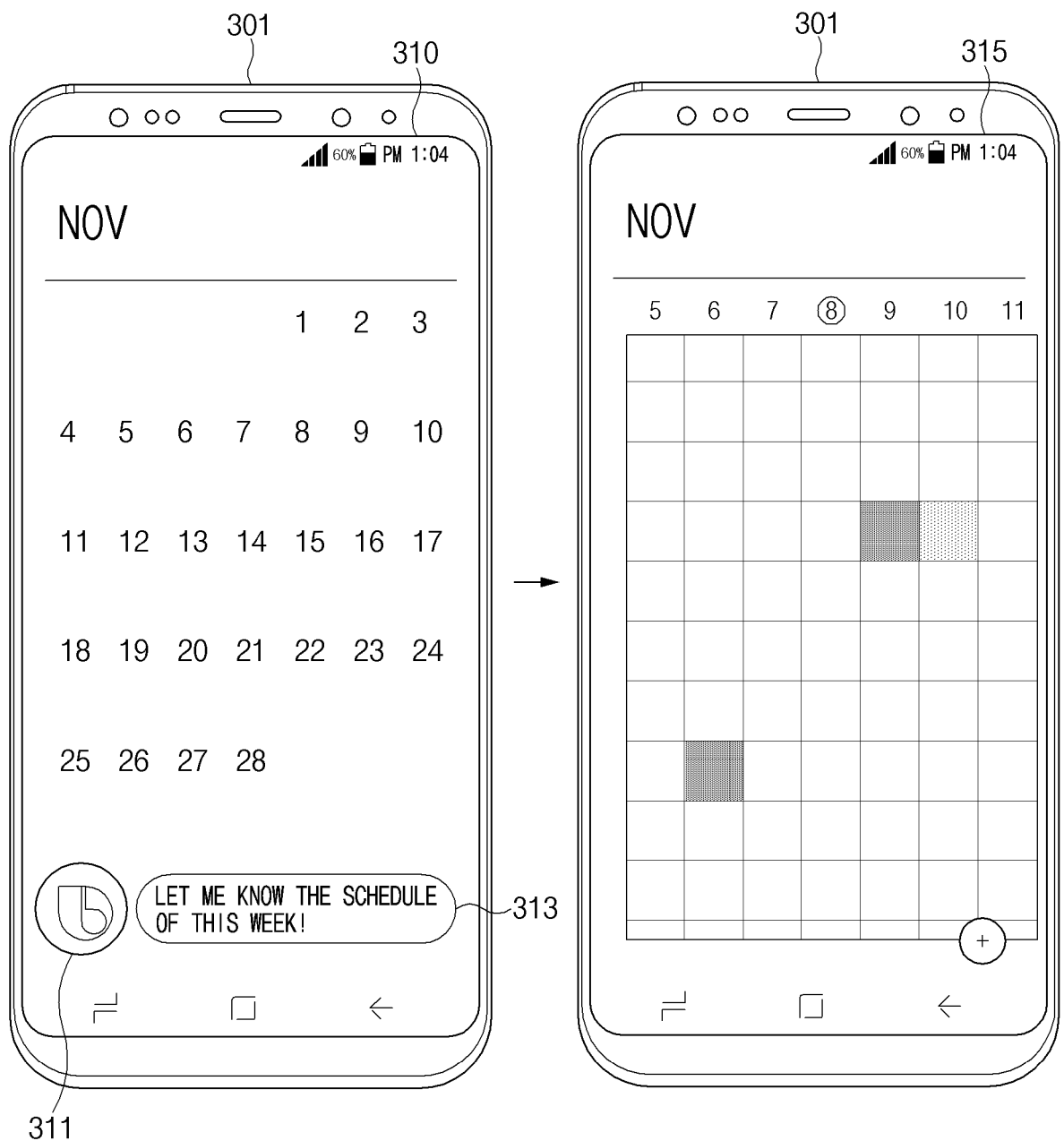
FIG. 5 is a diagram illustrating a user terminal displaying a screen of processing a voice input received through an intelligence app, according to various embodiments.

FIG. 5 is a diagram illustrating an example screen in which a user terminal processes a voice input received through an intelligence app, according to various embodiments.

The user terminal 301 may execute an intelligence app to process a user input through the intelligence server 400.

According to an embodiment, on screen 310, when recognizing a specified voice input (e.g., wake up!) or receiving an input via a hardware key (e.g., a dedicated hardware key), the user terminal 301 may launch an intelligence app for processing a voice input. For example, the user terminal 301 may launch the intelligence app in a state where a schedule app is executed. According to an embodiment, the user terminal 301 may display an object (e.g., an icon) 311 corresponding to the intelligence app, on the display 360. According to an embodiment, the user terminal 301 may receive a voice input by a user utterance. For example, the user terminal 301 may receive a voice input saying that "let me know the schedule of this week!". According to an embodiment, the user terminal 301 may display a user interface (UI) 313 (e.g., an input window) of the intelligence app, in which text data of the received voice input is displayed, on a display.

According to an embodiment, on screen 315, the user terminal 301 may display a result corresponding to the received voice input, on the display. For example, the user terminal 301 may receive a plan corresponding to the received user input and may display 'the schedule of this week' on the display depending on the plan.

In an embodiment, the user terminal 301 of FIGS. 3, 4, and 5 may correspond to the electronic device 101 of FIG. 1. In an embodiment, the intelligence server 400 of FIG. 3 may correspond to one of the electronic device 104 and the server 108 of FIG. 1. In an embodiment, the processor 320 of FIG. 3 may correspond to the processor 120 of FIG. 1; the display 360 of FIG. 3 may correspond to the display device 160 of FIG. 1; the speaker 355 of FIG. 3 may correspond to the sound output device 155 of FIG. 1.

Figure 6:
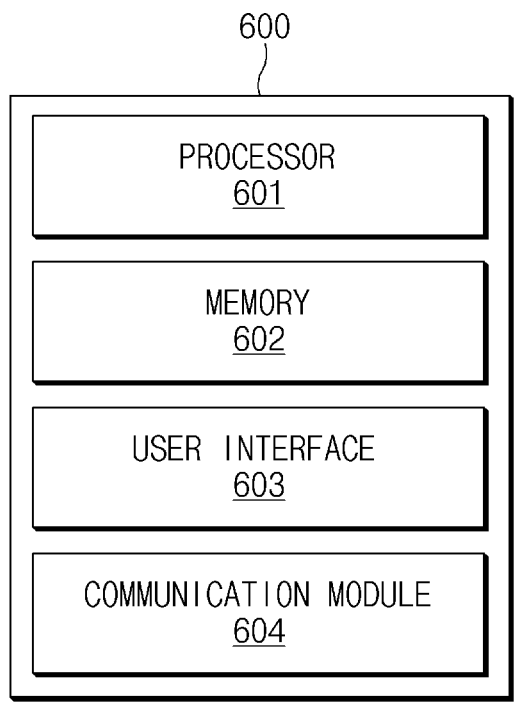
FIG. 6 is a block diagram illustrating an example configuration of an electronic device, according to various embodiments.

FIG. 6 is a block diagram illustrating an example configuration of an electronic device 600, according to various embodiments. For clarity of description, details the same as or similar to the above-described details may be briefly described or may not be repeated here.

Referring to FIG. 6, the electronic device 600 may include a processor (e.g., including processing circuitry) 601 (e.g., the processor 320 of FIG. 3 and/or the processor 120 of FIG. 1), a memory 602 (e.g., the memory 130 of FIG. 1), a user interface (e.g., including interface circuitry) 603, and a communication module (e.g., including communication circuitry) 604 (e.g., the communication module 190 of FIG. 1). The user interface 603 may include a microphone (not illustrated) (e.g., the microphone 370 of FIG. 3 and/or the input module 150 of FIG. 1) and a speaker (not illustrated) (e.g., the speaker 355 of FIG. 3 and/or the sound output device 155 of FIG. 1).

The electronic device 600 may further include at least one of additional components in addition to the components illustrated in FIG. 6. According to an embodiment, the components of the electronic device 600 may be the same entities or may include separate entities.

For example, the electronic device 600 may include, without limitation, a smartphone, a tablet PC, a wearable device, a home appliance, a digital camera or the like. According to an embodiment, the processor 601 may include various processing circuitry and be operatively coupled to the communication module 604, the memory 602, and the user interface 603 (a microphone (not illustrated) and a speaker (not illustrated)) to perform overall functions of the electronic device 600. For example, the processor 601 may include one or more processors. For example, the one or more processors may include an image signal processor (ISP), an application processor (AP), or a communication processor (CP).

Furthermore, the processor 601 may drive a module by executing instructions stored in the memory 602.

Figure 7:
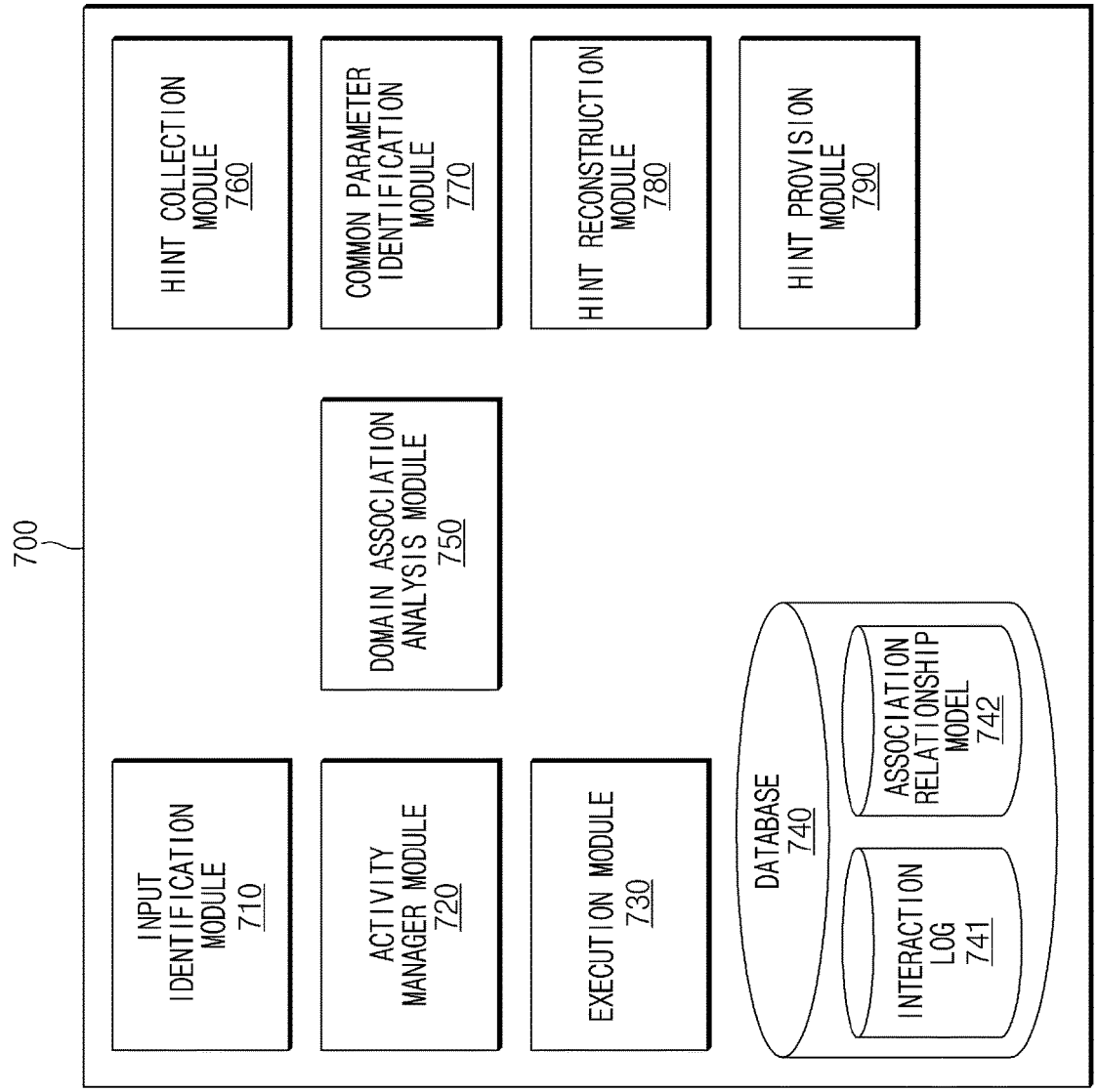
FIG. 7 is a block diagram illustrating an example configuration of an electronic device, according to various embodiments.
Figure 8:
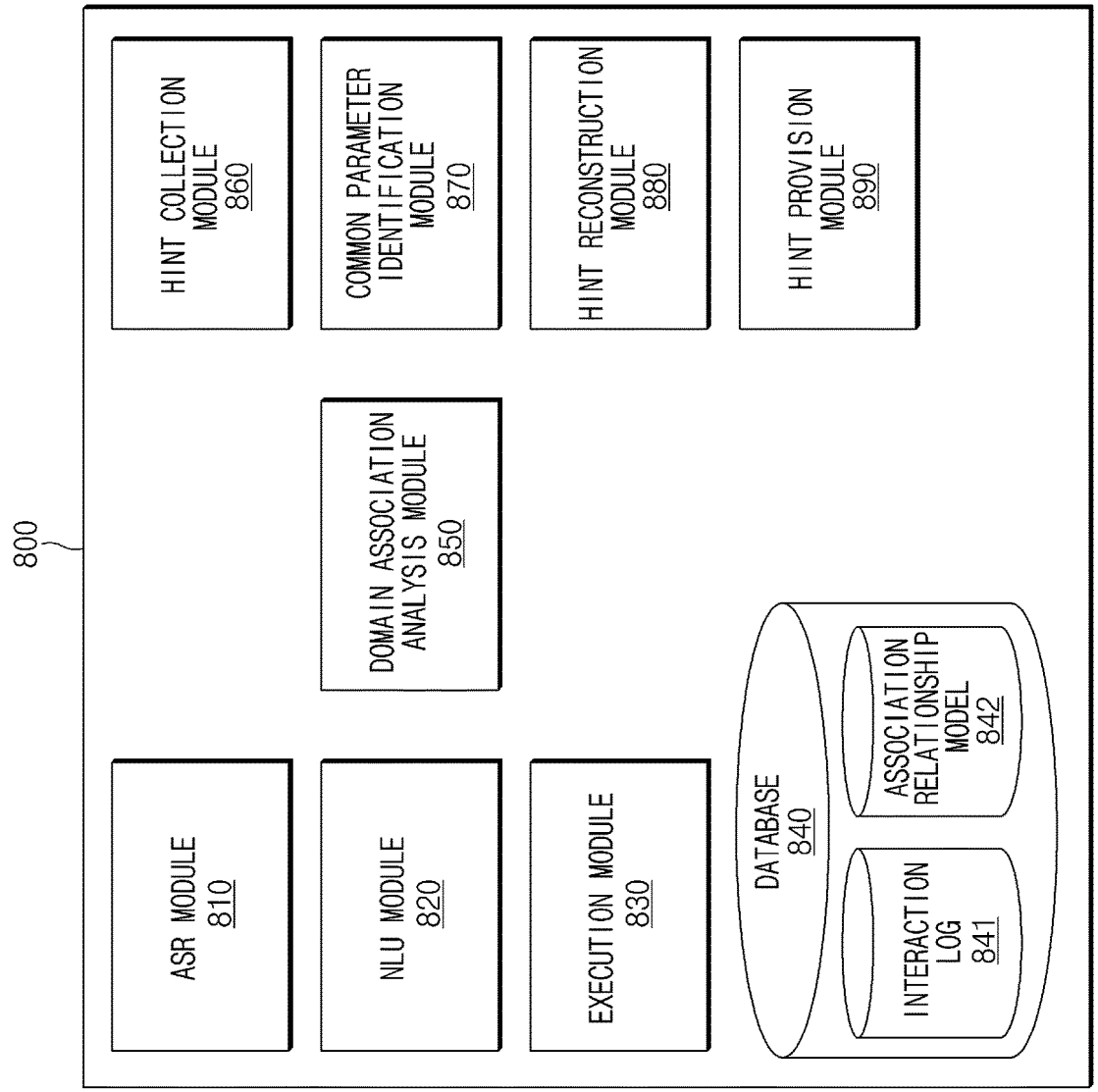
FIG. 8 is a block diagram illustrating an example configuration of an electronic device when a user input is a voice input, according to various embodiments.

To perform overall functions of the electronic device 600, the processor 601 may be operatively coupled to a module (e.g., an input identification module 710, an activity manager module 720, an execution module 730, a domain association analysis module 750, a hint collection module 760, a common parameter identification module 770, a hint reconstruction module 780 and/or a hint provision module 790 in FIG. 7, an ASR module 810, an NLU module 820, an execution module 830, a domain association analysis module 850, a hint collection module 860, a common parameter identification module 870, a hint reconstruction module 880 and/or a hint provision module 890 in FIG. 8). In various embodiments, an operation performed (or executed) by a module (e.g., the input identification module 710, the activity manager module 720, the execution module 730, the domain association analysis module 750, the hint collection module 760, the common parameter identification module 770, the hint reconstruction module 780 and/or the hint provision module 790 in FIG. 7, the ASR module 810, the NLU module 820, the execution module 830, the domain association analysis module 850, the hint collection module 860, the common parameter identification module 870, the hint reconstruction module 880 and/or the hint provision module 890 in FIG. 8) may, for example, be understood as an operation performed as the processor 601 executes instructions stored in the memory 602.

In an embodiment, the processor 601 may include a module (e.g., the input identification module 710, the activity manager module 720, the execution module 730, the domain association analysis module 750, the hint collection module 760, the common parameter identification module 770, the hint reconstruction module 780 and/or the hint provision module 790 in FIG. 7, the ASR module 810, the NLU module 820, the execution module 830, the domain association analysis module 850, the hint collection module 860, the common parameter identification module 870, the hint reconstruction module 880 and/or the hint provision module 890 in FIG. 8). In this case, an operation performed (or executed) by each module (e.g., the input identification module 710, the activity manager module 720, the execution module 730, the domain association analysis module 750, the hint collection module 760, the common parameter identification module 770, the hint reconstruction module 780 and/or the hint provision module 790 in FIG. 7, the ASR module 810, the NLU module 820, the execution module 830, the domain association analysis module 850, the hint collection module 860, the common parameter identification module 870, the hint reconstruction module 880 and/or the hint provision module 890 in FIG. 8) may be implemented as at least part of the processor 601.

Several modules described in various embodiments of the disclosure may be implemented by hardware or software.

The memory 602 may store a database (not illustrated) (e.g., the database 740 of FIG. 7 or the database 840 of FIG. 8) including at least one input data. The memory 602 may store commands, information, or data associated with operations of components included in the electronic device 600. For example, the memory 602 may store instructions, when executed, that cause the processor 601 to perform various operations described in the disclosure.

In an embodiment, the electronic device 600 may receive a user input using the user interface 603. The user input may include various input circuitry and be an input including a user voice signal (e.g., a user's utterance input).

In an embodiment, the user input may be the user's voice input (e.g., an utterance). When the user input is a voice input, the electronic device 600 may receive a user input through a microphone (or a voice receiving device) (not illustrated).

In an embodiment, the user input may be a gesture input and/or a touch input. When the user input is a gesture input and/or a touch input, the electronic device 600 may receive a user input through a sensor (not illustrated).

According to an embodiment, the processor 601 may include a sound module (not illustrated). The sound module may recognize a user input for executing an operation. For example, the sound module may recognize and receive the voice signal. For example, the sound module recognizing the user input may have a high speech recognition rate because ambient noise is strong.

According to an embodiment, the sound module may be learned to recognize and receive the user input using an algorithm for recognizing a voice. For example, the algorithm for recognizing the voice may be at least one of a hidden Markov model (HMM) algorithm, an artificial neural network (ANN) algorithm, and a dynamic time warping (DTW) algorithm.

According to an embodiment, the sound module may perform tasks of data refinement, data integration, data reduction, and/or data conversion. The data refinement may include an operation of filling in incomplete data and correcting inconsistent data. The data integration may include an operation of merging various divided databases and files for easy analysis. The data reduction may include an operation of sampling only some of input data or reducing the dimension of data to be analyzed. The data conversion may include an operation of normalizing or grouping data by obtaining an average value of the data. The sound module may process data, thereby preventing and/or reducing meaningless values from being included in data or preventing and/or reducing data quality from being degraded due to unintended variables. Accuracy and timeliness may be increased through the sound module.

In an embodiment, at least one operation among operations of each component described with reference to the electronic device 600 may be performed (or executed) by an external server (not illustrated) or another electronic device (not illustrated). For example, the processor 601 may transmit a user input to the external server (not illustrated) or the other electronic device (not illustrated) using the communication module 604.

A processor (not illustrated) included in an external server (not illustrated) or the other electronic device (not illustrated) may receive the user input, may generate response data, and may transmit the response data to the electronic device 600.

The processor 601 may receive the response data corresponding to the user input from the external server (not illustrated) or the other electronic device (not illustrated) through the communication module 604. When receiving the response data, the processor 601 may allow the output device 603 to output the response data. Other devices may be controlled through the communication module 604; data may be stored through the communication module 604. The processor 601 may include at least one or more processors, and may be driven while being physically divided into a main processor performing high-performance processing and an auxiliary processor performing low-power processing. A processor may process data while switching between high performance and low power depending on situations.

Hereinafter, an operation of the processor 601 will be described in greater detail.

In an embodiment, the processor 601 may receive a user input through the user interface, may analyze a domain association for at least one or more domains, which are included in the electronic device or operatively connected to the electronic device, in response to the user input, to collect at least one hint defined in the at least one or more domains, may identify a common parameter for the collected at least one hint, may reconstruct the hint using the identified common parameter, and may provide response data including the reconstructed hint, using the user interface.

The processor 601 may receive a voice signal included in the user input using the sound model and may cause the sound model to be learned using a learning algorithm.

In an embodiment, the processor 601 may select a domain for providing the hint based on the domain association.

In an embodiment, the processor 601 may execute a domain in response to the user input, may store the user input and information about the domain, may generate a relational model using the stored information, and may analyze the domain association using the relational model.

In an embodiment, the processor 601 may learn the domain association using the relational model.

In an embodiment, the processor 601 may analyze a domain association for a domain based on at least one of a time and a place at which the domain is used, with respect to the at least one or more domains, which are included in the electronic device or connected to the electronic device.

In an embodiment, the processor 601 may analyze a domain association for a domain based on an order relationship in which the domain is used, with respect to at least one or more domains, which are included in the electronic device or connected to the electronic device.

In an embodiment, the processor 601 may identify identical parameters capable of being changed in the collected hint and may extract a common parameter from the identical parameters.

In an embodiment, the processor 601 may extract the common parameter based on the collected hint.

In an embodiment, the processor 601 may extract the common parameter based on the user input.

FIG. 7 is a block diagram illustrating an example configuration of an electronic device 700, according to various embodiments. For clarity of description, details the same as or similar to the above-described details may be briefly described or may not be repeated here.

According to an embodiment, an electronic device 700 may include the input identification module 710, the activity manager module 720, the execution module 730, a database 740, the domain association analysis module 750, the hint collection module 760, the common parameter identification module 770, the hint reconstruction module 780, and/or the hint provision module 790. The listed components may be operatively or electrically connected to one another. The modules may include various processing circuitry and/or executable program instructions.

The input identification module 710 may identify the received user input. In an embodiment, the input identification module 710 may grasp the intent of a user included in the received user input. For example, when the user input is a touch input, the input identification module 710 may grasp the meaning of the touch input in response to the touch input and then may grasp the user's intent by matching the grasped meaning of the touch input to the intent. For example, the input identification module 710 may determine whether the touch input corresponds to the intent for requesting execution of an app, which is included in the electronic device 700 or operatively connected to the electronic device 700. As another example, when the user input is a gesture input, the input identification module 710 may grasp the meaning of the gesture input in response to the gesture input and then may grasp the user's intent by matching the grasped meaning of the gesture input to the intent. For example, the input identification module 710 may determine whether the gesture input corresponds to the intent for requesting execution of an app, which is included in the electronic device 700 or operatively connected to the electronic device 700.

The activity manager module 720 may select a domain for executing an action according to the grasped intent of the user. In an embodiment, when there are a plurality of domains for executing the intent grasped from the user input, the activity manager module 720 may select a domain for executing an action according to the user's intent based on the user's past usage history and/or preset priorities. For example, when the user intent grasped from the user input is "guide me to Gangnam Station", the activity manager module 720 may select a navigation app, which is included in the electronic device 700 or operatively connected to the electronic device 700, as a domain.

The execution module 730 may perform an action defined in the domain that matches the intent of the user input in the selected domain. For example, when the user intent grasped from the user input is "guide me to Gangnam Station" and a navigation app is selected as the domain, the execution module 730 may execute the navigation app and may allow the navigation app to perform an operation of displaying a route for guiding a user to Gangnam Station.

In an embodiment, the execution module 730 may store the user input and data about the executed domain in an interaction log 741. The data stored in the interaction log 741 may be used to analyze the user input.

The domain association analysis module 750 may extract a domain list associated with the user's input and/or the executed domain and then may analyze a relationship between domains included in the extracted domain list.

In an embodiment, based on a correlation between domains, the domain association analysis module 750 may extract an association relationship between the domains. For example, the domain association analysis module 750 may analyze the correlation between the domains based on the correlation over time between domains and then may extract the association relationship between the domains.

For better understanding, it is assumed that domain 'a' and domain 'b' are included in the domain list. In an embodiment, the domain association analysis module 750 may extract the association relationship between domain 'a' and domain 'b' based on the execution order of domain "a" and domain "b" over time. For example, the domain association analysis module 750 may identify a case that domain 'b' is executed after domain 'a' is executed, a case that domain 'a' is executed again after domain 'a' is executed, and a case that domain 'a' is executed and then terminated, based on the execution order of domain "a" and domain "b" over time and then may extract the association relationship between domain 'a' and domain 'b'.

In an embodiment, the domain association analysis module 750 may extract the association relationship between domain 'a' and domain 'b' based on whether domain 'a' and domain 'b' are mixed and used.

In an embodiment, the domain association analysis module 750 may extract the association relationship between domain 'a' and domain 'b' based on the user's context for domain 'a' and domain 'b'. For example, the domain association analysis module 750 may extract the association relationship between domain 'a' and domain 'b' based on a time and place at which domain 'a' and domain 'b' are used. For example, the domain association analysis module 750 may extract the association relationship for domain 'a' and domain 'b' based on whether a time at which domain 'a' is used is adjacent to a time at which domain 'b' is used.

In an embodiment, the domain association analysis module 750 may generate the extracted association relationship as a model and may store the model in an association relationship model 742 of the database 740.

According to an embodiment, the domain association analysis module 750 may generate the association relationship model 742 using an AI system. The AI system may be a rule-based system, or may be a neural network-based system (e.g., a feedforward neural network (FNN) and/or a recurrent neural network (RNN)). The AI system may be a combination of the above-described systems or an AI system different from the above-described system.

In an embodiment, the domain association analysis module 750 may select a domain for providing a hint using the extracted association relationship model. The hint may refer, for example, to a recommendation input used for the domain to introduce its main function. For example, in a famous restaurant search domain, the hint may be defined such as "find a nearby famous restaurant" or "where is a famous Chinese restaurant in Gangnam Station".

The hint collection module 760 may collect hints defined in a domain. In an embodiment, the hint collection module 760 may extract at least one or more hints defined in each domain for the domain, which is included in a list and which is extracted as a domain associated with the user's input and/or the executed domain. For example, it is assumed that domains included in the domain list are navigation, restaurants, and weather. The hint collection module 760 may extract "guide me to Seoul Station" using a hint defined in a navigation domain; the hint collection module 760 may extract "find a nearby famous restaurant" using a hint defined in a restaurant domain; and, the hint collection module 760 may extract "tell me this weekend weather" using a hint defined in a weather domain.

In an embodiment, the hint collection module 760 may store at least one hint defined in each domain together with respective domain information. For example, the hint collection module 760 may store a hint of "guide me to Seoul Station" predefined in the navigation domain together with the navigation domain information.

In an embodiment, the hint collection module 760 may collect at least one or more hints thus collected.

The common parameter identification module 770 may identify the same parameters capable of being changed in the hint collected in the hint collection module 760 and then may identify a common parameter among the same parameters. In an embodiment, the common parameter identification module 770 may identify the common parameter based on the user input. For example, it is assumed that the user input is "guide me to Gangnam Station", a domain determined as the domain for providing a hint is a restaurant domain, and a hint extracted from the restaurant domain is 'tell me a famous restaurant near the station'. The common parameter identification module 770 may identify 'Gangnam Station' of the user input and 'Station' of the extracted hint as the same parameter based on the user input. The common parameter identification module 770 may identify 'Gangnam Station' as a common parameter among the identified same parameters based on the user input.

In an embodiment, the common parameter identification module 770 may identify the common parameter based on the collected hints. For example, it is assumed that hints extracted from different domains are "tell me a famous restaurant in Insa-dong" and "how is the weather at Gangnam Station". The common parameter identification module 770 may identify "Insa-dong" and "Gangnam Station" as the same parameter in each hint extracted from different domains. As another example, it is assumed that hints extracted from different domains are "make a call to Mom", "send pocket money to my son", and "send a text message to my son". The common parameter identification module 770 may identify 'Mom' and 'my son' of the extracted hint as the same parameter. The common parameter identification module 770 may identify 'my son' as a common parameter based on 'my son', which is used in two hints out of the extracted three hints, from among the identified same parameters.

In an embodiment, the common parameter identification module 770 may identify a common parameter based on a tag. The tag may be provided by a domain developer and may refer, for example, to a common category.

In an embodiment, the common parameter identification module 770 may identify the common parameter through learning such as machine learning.

The hint reconstruction module 780 may reconstruct the hint using the common parameter identified by the common parameter identification module 770. For example, it is assumed that the domain for providing hints is selected as a restaurant domain, a hint extracted from the restaurant domain is "tell me a famous restaurant near the station", and the common parameter is "Gangnam Station". The hint reconstruction module 780 may reconstruct 'tell me a famous restaurant near the station', which is a hint extracted from the restaurant domain, into 'tell me a famous restaurant near Gangnam station' using the common parameter 'Gangnam Station'. The electronic device 700 may reconstruct hints, which are uniformly defined regardless of a user in a domain, into user-customized hints by reconstructing the hints using the common parameter.

The hint provision module 790 may provide a user with response data including the reconstructed hint using an output device (e.g., a display or a speaker) included in the electronic device 700 or operatively connected to the electronic device 700. In an embodiment, the electronic device 700 may further include a TTS module (not shown). The TTS module (not shown) may convert the response data including the hint in a form of a text into voice data. The electronic device 700 (and/or a processor (not shown)) may output response data converted into voice data through a speaker (not shown).

According to an embodiment, the electronic device 101 may use domains, which are consecutive and which are sometimes similar to one another, depending on the user's needs at once, not staying in one domain, by providing hints based on domain association.

According to an embodiment, the electronic device 101 may provide the user with appropriate hints suitable for a context by providing hints based on the user input.

FIG. 8 is a block diagram illustrating an example configuration of an electronic device 800 when a user input is a voice input, according to various embodiments. For clarity of description, details the same as or similar to the above-described details may be briefly described or may not be repeated here.

According to an embodiment, an electronic device 800 may include the ASR module 810 (e.g., the ASR module 421 of FIG. 3), the NLU module 820 (e.g., the NLU module 423 of FIG. 3), the execution module 830, the domain association analysis module 850, the hint collection module 860, the common parameter identification module 870, the hint reconstruction module 880 and/or the hint provision module 890. The listed components may be operatively or electrically connected to one another.

The ASR module 810 may convert the received user input into text data. For example, the ASR module 810 may convert the received voice data into text data.

The NLU module 820 may grasp the user's intent by performing syntactic analysis or semantic analysis. According to an embodiment, the NLU module 820 may grasp the meaning of words extracted from the voice input using linguistic features (e.g., syntactic elements) such as morphemes or phrases and may determine the intent of the user by matching the grasped meaning of the words to the intent.

In an embodiment, the NLU module 820 may select a domain for executing an action according to the grasped intent of the user. In an embodiment, when there are a plurality of domains for executing the intent grasped from the user input, the NLU module 820 may select a domain for executing an action according to the user's intent based on the user's past usage history and/or preset priorities. For example, when the user intent grasped from the user input is "guide me to Gangnam Station", the NLU module 820 may select a navigation app, which is included in the electronic device 800 or operatively connected to the electronic device 800, as a domain.

The execution module 830 may perform an action defined in the domain that matches the intent of the user input in the selected domain. For example, when the user intent grasped from the user input is "guide me to Gangnam Station" and a navigation app is selected as the domain, the execution module 830 may allow the navigation app to perform an operation of guiding a user to Gangnam Station.

In an embodiment, the execution module 830 may store the user input and the executed domain in an interaction log 841. The data stored in the interaction log 841 may be used to analyze the user input.

The domain association analysis module 850 may extract a domain list associated with the user's input and/or the executed domain and then may analyze a relationship between domains included in the extracted domain list.

In an embodiment, based on a correlation between domains, the domain association analysis module 850 may extract an association relationship between the domains. For example, the domain association analysis module 850 may analyze the correlation between the domains based on the correlation over time between domains and then may extract the association relationship between the domains.

For better understanding, it is assumed that domain 'a' and domain 'b' are included in the domain list. In an embodiment, the domain association analysis module 850 may extract the association relationship between domain 'a' and domain 'b' based on the execution order of domain "a" and domain "b" over time. For example, the domain association analysis module 850 may identify a case that domain 'b' is executed after domain 'a' is executed, a case that domain 'a' is executed again after domain 'a' is executed, and a case that domain 'a' is executed and then terminated, based on the execution order of domain "a" and domain "b" over time and then may extract the association relationship between domain 'a' and domain 'b'.

In an embodiment, the domain association analysis module 850 may extract the association relationship between domain 'a' and domain 'b' based on whether domain 'a' and domain 'b' are mixed and used.

In an embodiment, the domain association analysis module 850 may extract the association relationship between domain 'a' and domain 'b' based on the user's context for domain 'a' and domain 'b'. For example, the domain association analysis module 850 may extract the association relationship between domain 'a' and domain 'b' based on a time and place at which domain 'a' and domain 'b' are used. For example, the domain association analysis module 850 may extract the association relationship for domain 'a' and domain 'b' based on whether a time at which domain 'a' is used is adjacent to a time at which domain 'b' is used.

In an embodiment, the domain association analysis module 850 may generate the extracted association relationship as a model and may store the model in an association relationship model 842 of the database 840.

According to an embodiment, the domain association analysis module 850 may generate the association relationship model 842 using an AI system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system.

In an embodiment, the domain association analysis module 850 may select a domain for providing a hint using the extracted association relationship model.

The hint collection module 860 may collect hints defined in a domain. In an embodiment, the hint collection module 860 may extract at least one hint defined in each domain for the domain included in a domain list associated with the user's input and/or the executed domain. For example, it is assumed that domains included in the domain list are navigation, restaurants, and weather. The hint collection module 860 may extract "guide me to Seoul Station" using a hint defined in a navigation domain; the hint collection module 860 may extract "find a nearby famous restaurant" using a hint defined in a restaurant domain; and, the hint collection module 860 may extract "tell me this weekend weather" using a hint defined in a weather domain.

In an embodiment, the hint collection module 860 may collect at least one hint thus collected.

The common parameter identification module 870 may identify the same parameters capable of being changed in the hint collected in the hint collection module 860 and then may identify a common parameter among the same parameters. In an embodiment, the common parameter identification module 870 may identify the common parameter based on the user input. For example, it is assumed that the user input is "guide me to Gangnam Station", a domain determined as the domain for providing a hint is a restaurant domain, and a hint extracted from the restaurant domain is 'tell me a famous restaurant near the station'. The common parameter identification module 870 may identify 'Gangnam Station' of the user input and 'Station' of the extracted hint as the same parameter based on the user input. The common parameter identification module 870 may identify 'Gangnam Station' among the identified same parameters as a common parameter based on the user input.

In an embodiment, the common parameter identification module 870 may identify the common parameter based on the collected hints. For example, it is assumed that hints extracted from different domains are "tell me a famous restaurant in Insa-dong" and "how is the weather at Gangnam Station". The common parameter identification module 870 may identify "Insa-dong" and "Gangnam Station" as the same parameter in each hint extracted from different domains. As another example, it is assumed that hints extracted from different domains are "make a call to Mom", "send pocket money to my son", and "send a text message to my son". The common parameter identification module 870 may identify 'Mom' and 'my son' of the extracted hint as the same parameter. The common parameter identification module 870 may identify 'my son' as a common parameter based on 'my son', which is used in two hints out of the extracted three hints, from among the identified same parameters.

The hint reconstruction module 880 may reconstruct the hint using the common parameter identified by the common parameter identification module 870. For example, it is assumed that the domain for providing hints is selected as a restaurant domain, a hint extracted from the restaurant domain is "tell me a famous restaurant near the station", and the common parameter is "Gangnam Station". The hint reconstruction module 880 may reconstruct 'tell me a famous restaurant near the station', which is a hint extracted from the restaurant domain, into 'tell me a famous restaurant near Gangnam station' using the common parameter 'Gangnam Station'. The electronic device 800 may reconstruct hints into user-customized hints by reconstructing the hints using the common parameter.

The hint provision module 890 may provide a user with response data including the reconstructed hint using an output device (e.g., a display or a speaker) included in the electronic device 800 or operatively connected to the electronic device 800. In an embodiment, the electronic device 800 may further include a TTS module (not shown). The TTS module (not shown) may convert the response data including the hint in a form of a text into voice data. The electronic device 800 (and/or a processor (not shown)) may output response data converted into voice data through a speaker (not shown).

According to an embodiment, the electronic device 101 may use domains, which are consecutive and which are sometimes similar to one another, depending on the user's needs at once, not staying in one domain, by providing hints based on domain association.

According to an embodiment, the electronic device 101 may provide the user with appropriate hints suitable for a context by providing hints based on the user input.

Hereinafter, a method performed by the electronic device 101 according to an embodiment will be described in greater detail below with reference to FIGS. 9 and 10.

Figure 9:
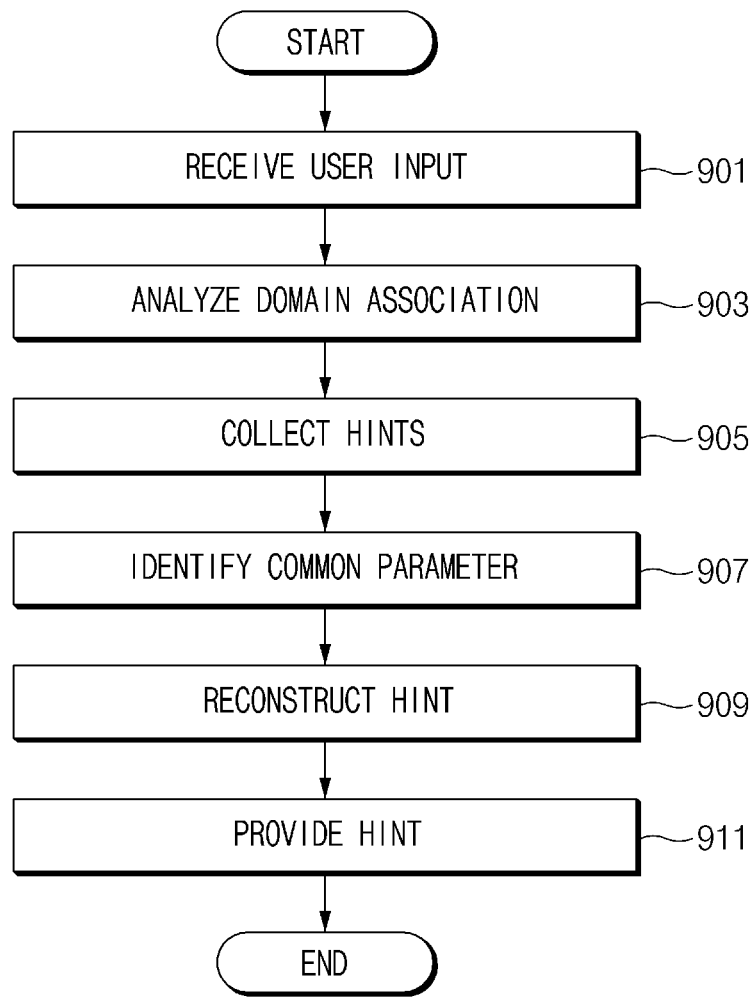
FIG. 9 is a flowchart illustrating an example method performed by an electronic device, according to various embodiments.

FIG. 9 is a flowchart 900 illustrating an example method performed by an electronic device, according to various embodiments. According to an embodiment, it may be understood that the process illustrated in FIG. 9 is performed by the processor (e.g., the processor 120 of FIG. 1) of an electronic device (e.g., the electronic device 101 of FIG. 1) by executing instructions stored in a memory (e.g., the memory 130 of FIG. 1).

In operation 901, the electronic device 101 may receive a user input. The user input may include a touch input, a gesture input, and/or a voice input. In an embodiment, the electronic device 101 may receive the user input using a user interface.

In an embodiment, the user input may be the user's voice input (e.g., an utterance). When the user input is a voice input, the electronic device 101 may receive the user input through a microphone (or a voice receiving device) included in the electronic device or operatively connected to the electronic device.

In an embodiment, the user input may be a gesture input and/or a touch input. When the user input is a gesture input and/or a touch input, the electronic device 101 may receive the user input through a sensor included in the electronic device or operatively connected to the electronic device.

In an embodiment, the electronic device 101 may identify input data matched with the received user input. For example, when the user input is a voice input (e.g., an utterance), the electronic device 101 may convert the received user input into text data. In an embodiment, the electronic device 101 may process data of the received voice input of the user. For example, the electronic device 101 may perform data refinement, data integration, data reduction, and/or data conversion on the received voice input data of the user. The electronic device 101 may improve the quality of data by processing the data.

In an embodiment, the electronic device 101 may identify the received user input. The electronic device 101 may grasp the user's intent included in the received user input. For example, when the user input is a gesture input, the electronic device 101 may grasp the meaning of the gesture input in response to the gesture input and then may grasp the user's intent by matching the grasped meaning of the gesture input to the intent.

The electronic device 101 may select a domain for executing an action according to the grasped intent of the user. In an embodiment, when there are a plurality of domains for executing the intent grasped from the user input, the electronic device 101 may select a domain for executing an action according to the user's intent based on the user's past usage history and/or preset priorities.

The electronic device 101 may perform an action defined in the domain that matches the intent of the user input in the selected domain. For example, when the user intent grasped from the user input is "guide me to Gangnam Station", the electronic device 101 may select a navigation app, which is included in the electronic device 101 or operatively connected to the electronic device 101, as a domain. The electronic device 101 may execute the navigation app and may allow the navigation app to perform an operation of displaying a route for guiding a user to Gangnam Station.

In operation 903, the electronic device 101 may analyze domain association. In an embodiment, the electronic device 101 may extract a domain list associated with the user's input and/or the executed domain and then may analyze a relationship between domains included in the extracted domain list. The electronic device 101 may select a domain for providing a hint using the extracted association relationship model.

In an embodiment, based on a correlation between domains, the electronic device 101 may extract an association relationship between the domains. For example, the electronic device 101 may analyze the correlation between the domains based on the correlation over time between domains and then may extract the association relationship between the domains.

For better understanding, it is assumed that domain 'a' and domain 'b' are included in the domain list. In an embodiment, the domain association analysis module 750 may extract the association relationship between domain 'a' and domain 'b' based on the execution order of domain "a" and domain "b" over time. For example, the domain association analysis module 750 may identify a case that domain 'b' is executed after domain 'a' is executed, a case that domain 'a' is executed again after domain 'a' is executed, and a case that domain 'a' is executed and then terminated, based on the execution order of domain "a" and domain "b" over time and then may extract the association relationship between domain 'a' and domain 'b'.

In an embodiment, the electronic device 101 may extract the association relationship between domain 'a' and domain 'b' based on whether domain 'a' and domain 'b' are mixed and used.

In an embodiment, the electronic device 101 may extract the association relationship between domain 'a' and domain 'b' based on the user's context for domain 'a' and domain 'b'. For example, the electronic device 101 may extract the association relationship between domain 'a' and domain 'b' based on a time and place at which domain 'a' and domain 'b' are used. For example, the electronic device 101 may extract the association relationship for domain 'a' and domain 'b' based on whether a time at which domain 'a' is used is adjacent to a time at which domain 'b' is used.

In operation 905, the electronic device 101 may collect hints. In an embodiment, the electronic device 101 may extract at least one or more hints defined in each domain for the domain, which is included in a list and which is extracted as a domain associated with the user's input and/or the executed domain. For example, it is assumed that domains included in the domain list are navigation, restaurants, and weather. The electronic device 101 may extract "guide me to Seoul Station" using a hint defined in a navigation domain; the electronic device 101 may extract "find a nearby famous restaurant" using a hint defined in a restaurant domain; and, the electronic device 101 may extract "tell me this weekend weather" using a hint defined in a weather domain. The electronic device 101 may collect the extracted hints.

In operation 907, the electronic device 101 may identify a common parameter. The electronic device 101 may identify the same parameters capable of being changed in the collected hint and then may identify the common parameter among the same parameters.

In an embodiment, the electronic device 101 may identify the common parameter based on the user input. For example, it is assumed that the user input is "guide me to Gangnam Station", a domain determined as the domain for providing a hint is a restaurant domain, and a hint extracted from the restaurant domain is 'tell me a famous restaurant near the station'. The electronic device 101 may identify 'Gangnam Station' of the user input and 'Station' of the extracted hint as the same parameter based on the user input. The electronic device 101 may identify 'Gangnam Station as a common parameter' among the identified same parameters based on the user input.

In an embodiment, the electronic device 101 may identify the common parameter based on the collected hints. For example, it is assumed that hints extracted from different domains are "tell me a famous restaurant in Insa-dong" and "how is the weather at Gangnam Station". The electronic device 101 may identify "Insa-dong" and "Gangnam Station" as the same parameter in each hint extracted from different domains. As another example, it is assumed that hints extracted from different domains are "make a call to Mom", "send pocket money to my son", and "send a text message to my son". The electronic device 101 may identify 'Mom' and 'my son' of the extracted hint as the same parameter. The electronic device 101 may identify 'my son' as a common parameter based on 'my son', which is used in two hints out of the extracted three hints, from among the identified same parameters.

In operation 909, the electronic device 101 may reconstruct the hint. The electronic device 101 may reconstruct the hint using the identified common parameter. For example, the electronic device 101 may select a restaurant domain as the domain for providing the hint. The electronic device 101 may extract 'tell me a famous restaurant near the station' as a hint from the restaurant domain. The electronic device 101 may identify 'Gangnam Station' as a common parameter. The electronic device 101 may reconstruct 'tell me a famous restaurant near the station', which is a hint extracted from the restaurant domain, into 'tell me a famous restaurant near Gangnam station' using the common parameter 'Gangnam Station'. The electronic device 101 may reconstruct hints, which are uniformly defined regardless of a user in a domain, into user-customized hints by reconstructing the hints using the common parameter.

In operation 911, the electronic device 101 may provide the reconstructed hint. The electronic device 101 may provide a user with response data including the reconstructed hint using an output device (e.g., a display or a speaker) included in the electronic device 101 or operatively connected to the electronic device 101. In an embodiment, the electronic device 101 may convert response data including the hint in a form of a text into voice data using a TTS module. The electronic device 101 (and/or a processor (not shown)) may output response data converted into voice data through a speaker (not shown).

It is illustrated in FIG. 9 that the electronic device 101 may sequentially perform operation 901 to operation 911. However, this is only an example. For example, the operations may be performed in a different order or at the same time. A part of the operations may be performed by the electronic device 101 and the other parts may be performed by an external device. For example, operation 901 and operation 911 may be performed by the electronic device 101 and operation 903 to operation 909 may be performed by a server.

According to an embodiment, the electronic device 101 may use domains, which are consecutive and which are sometimes similar to one another, depending on the user's needs at once, not staying in one domain, by providing hints based on domain association.

According to an embodiment, the electronic device 101 may provide the user with appropriate hints suitable for a context by providing hints based on the user input.

Figure 10:
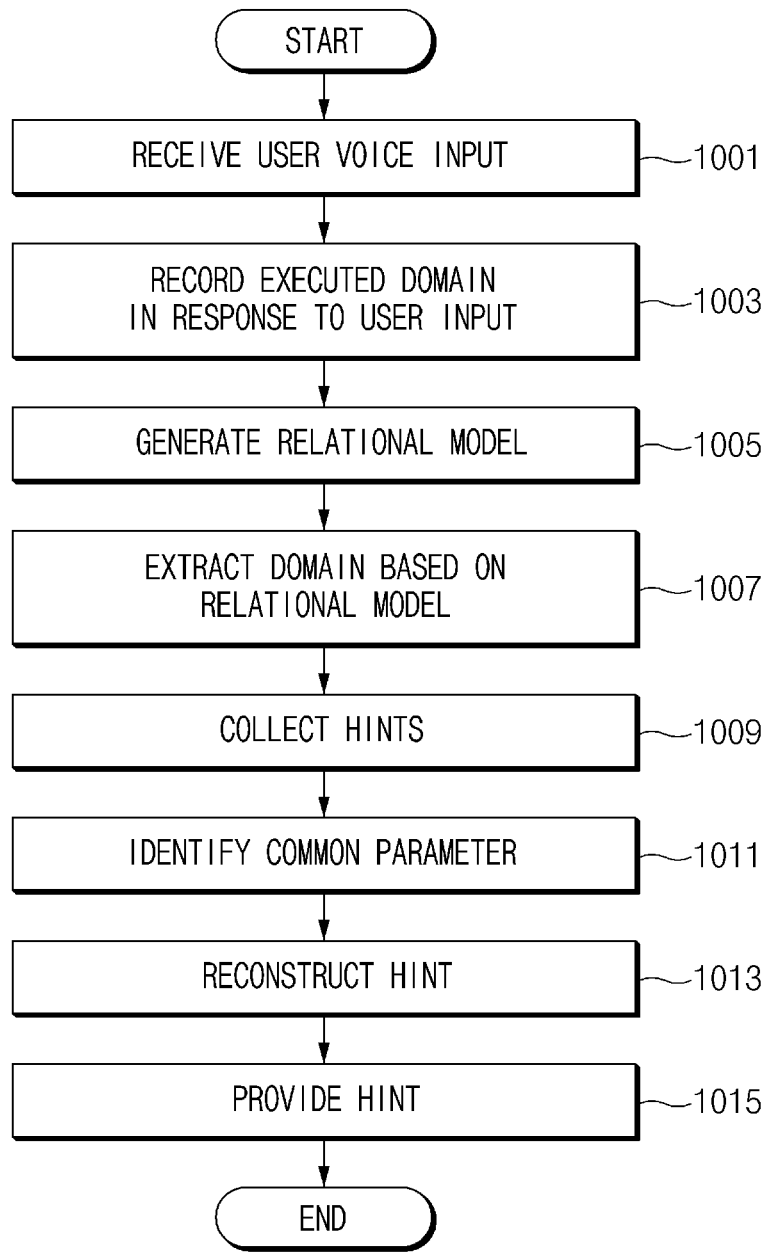
FIG. 10 is a flowchart illustrating an example method in which an electronic device reconstructs and provides a hint using a relational model, according to various embodiments.

FIG. 10 is a flowchart 1000 illustrating an example method in which the electronic device 101 reconstructs and provides a hint using a relational model according to various embodiments. According to an embodiment, it may be understood that the process illustrated in FIG. 10 is performed by the processor (e.g., the processor 120 of FIG. 1) of an electronic device (e.g., the electronic device 101 of FIG. 1) by executing instructions stored in a memory (e.g., the memory 130 of FIG. 1).

In operation 1001, the electronic device 101 may receive a user input. The user input may include a touch input, a gesture input, and/or a voice input. In an embodiment, the electronic device 101 may receive the user input using a user interface.

In an embodiment, the user input may be the user's voice input (e.g., an utterance). When the user input is a voice input, the electronic device 101 may receive the user input through a microphone (or a voice receiving device) included in the electronic device or operatively connected to the electronic device.

In an embodiment, the user input may be a gesture input and/or a touch input. When the user input is a gesture input and/or a touch input, the electronic device 101 may receive the user input through a sensor included in the electronic device or operatively connected to the electronic device.

In an embodiment, the electronic device 101 may identify input data matched with the received user input. For example, when the user input is a voice input (e.g., an utterance), the electronic device 101 may convert the received user input into text data. In an embodiment, the electronic device 101 may process data of the received voice input of the user. For example, the electronic device 101 may perform data refinement, data integration, data reduction, and/or data conversion on the received voice input data of the user. The electronic device 101 may improve the quality of data by processing the data.

In an embodiment, the electronic device 101 may identify the received user input. The electronic device 101 may grasp the user's intent included in the received user input. For example, when the user input is a gesture input, the electronic device 101 may grasp the meaning of the gesture input in response to the gesture input and then may grasp the user's intent by matching the grasped meaning of the gesture input to the intent.

The electronic device 101 may select a domain for executing an action according to the grasped intent of the user. In an embodiment, when there are a plurality of domains for executing the intent grasped from the user input, the electronic device 101 may select a domain for executing an action according to the user's intent based on the user's past usage history and/or preset priorities.

The electronic device 101 may perform an action defined in the domain that matches the intent of the user input in the selected domain. For example, when the user intent grasped from the user input is "guide me to Gangnam Station", the electronic device 101 may select a navigation app, which is included in the electronic device 101 or operatively connected to the electronic device 101, as a domain. The electronic device 101 may execute the navigation app and may allow the navigation app to perform an operation of displaying a route for guiding a user to Gangnam Station.

In operation 1003, the electronic device 101 may record the executed domain in response to a user input. In an embodiment, the execution module 101 may store the user input and data about the executed domain in a database.

In operation 1005, the electronic device 101 may generate a relational model. The electronic device 101 may generate the relational model using the recorded data. The relational model may refer, for example, to a model (e.g., the association relationship model 742 of FIG. 7 or the association relationship model 842 of FIG. 8) indicating an association relationship between domains.

In an embodiment, the electronic device 101 may generate a relational model using an AI system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system.

In an embodiment, the electronic device 101 may generate a relational model between the domains based on the correlation between the domains. In an embodiment, the electronic device 101 may analyze the correlation between the domains based on the correlation over time between domains and then may generate a relational model between the domains.

In an embodiment, the electronic device 101 may extract domains used together in chronological order and then may generate a relational model between the extracted domains. For example, when domain 'a' and domain 'b' are used together in chronological order, the electronic device 101 may extract domain 'a' and domain 'b' and then may generate a relational model between domain 'a' and domain 'b'. For example, the electronic device 101 may identify a case that domain 'b' is executed after domain 'a' is executed, a case that domain 'a' is executed again after domain 'a' is executed, and a case that domain 'a' is executed and then terminated, based on the execution order of domain "a" and domain "b" over time and then may generate the relational model between domain 'a' and domain 'b'.

In an embodiment, the electronic device 101 may extract domains, which are mixed and used within a short time, and then may generate the relational model between the extracted domains. For example, when domain 'a' and domain 'b' are mixed and used, the electronic device 101 may extract domain 'a' and domain 'b' and then may generate a relational model between domain 'a' and domain 'b'.

In an embodiment, the electronic device 101 may extract the association relationship between domain 'a' and domain 'b' based on the user's context for domain 'a' and domain 'b'. For example, the electronic device 101 may extract the association relationship between domain 'a' and domain 'b' based on a time and place at which domain 'a' and domain 'b' are used. For example, the electronic device 101 may generate the relational model of domain 'a' and domain 'b' based on whether a time at which domain 'a' is used is adjacent to a time at which domain 'b' is used.

In operation 1007, the electronic device 101 may extract a domain based on the relational model. The electronic device 101 may extract a domain associated with the domain executed in response to the user input based on the relational model. The electronic device 101 may select a domain for providing hints from among the extracted domains using the relational model.

In operation 1009, the electronic device 101 may collect hints. In an embodiment, the electronic device 101 may extract at least one or more hints defined in each domain for the domain, which is included in a list and which is extracted as a domain associated with the user's input and/or the executed domain. For example, it is assumed that domains included in the domain list are navigation, restaurants, and weather. The electronic device 101 may extract "guide me to Seoul Station" using a hint defined in a navigation domain; the electronic device 101 may extract "find a nearby famous restaurant" using a hint defined in a restaurant domain; and, the electronic device 101 may extract "tell me this weekend weather" using a hint defined in a weather domain. The electronic device 101 may collect the extracted hints.

In operation 1011, the electronic device 101 may identify a common parameter. The electronic device 101 may identify the same parameters capable of being changed in the collected hint and then may identify the common parameter among the same parameters.

In an embodiment, the electronic device 101 may identify the common parameter based on the user input. For example, it is assumed that the user input is "guide me to Gangnam Station", a domain determined as the domain for providing a hint is a restaurant domain, and a hint extracted from the restaurant domain is 'tell me a famous restaurant near the station'. The electronic device 101 may identify 'Gangnam Station' of the user input and 'Station' of the extracted hint as the same parameter based on the user input. The electronic device 101 may identify 'Gangnam Station as a common parameter' among the identified same parameters based on the user input.

In an embodiment, the electronic device 101 may identify the common parameter based on the collected hints. For example, it is assumed that hints extracted from different domains are "tell me a famous restaurant in Insa-dong" and "how is the weather at Gangnam Station". The electronic device 101 may identify "Insa-dong" and "Gangnam Station" as the same parameter in each hint extracted from different domains. As another example, it is assumed that hints extracted from different domains are "make a call to Mom", "send pocket money to my son", and "send a text message to my son". The electronic device 101 may identify 'Mom' and 'my son' of the extracted hint as the same parameter. The electronic device 101 may identify 'my son' as a common parameter based on 'my son', which is used in two hints out of the extracted three hints, from among the identified same parameters.

In operation 1013, the electronic device 101 may reconstruct the hint. The electronic device 101 may reconstruct the hint using the identified common parameter. For example, the electronic device 101 may select a restaurant domain as the domain for providing the hint. The electronic device 101 may extract 'tell me a famous restaurant near the station' as a hint from the restaurant domain. The electronic device 101 may identify 'Gangnam Station' as a common parameter. The electronic device 101 may reconstruct 'tell me a famous restaurant near the station', which is a hint extracted from the restaurant domain, into 'tell me a famous restaurant near Gangnam station' using the common parameter 'Gangnam Station'. The electronic device 101 may reconstruct hints, which are uniformly defined regardless of a user in a domain, into user-customized hints by reconstructing the hints using the common parameter.

In operation 1015, the electronic device 101 may provide the reconstructed hint. The electronic device 101 may provide a user with response data including the reconstructed hint using an output device (e.g., a display or a speaker) included in the electronic device 101 or operatively connected to the electronic device 101. In an embodiment, the electronic device 101 may convert response data including the hint in a form of a text into voice data using a TTS module. The electronic device 101 (and/or a processor (not shown)) may output response data converted into voice data through a speaker (not shown).

In an embodiment, when the first application is being executed, the electronic device 101 may allocate a pop-up form or a specific area for executing the second application inside the first application and then may display response data providing the hint.

The electronic device 101 may display the response data for providing the hint to a lock screen or an idle screen in a widget state.

It is illustrated in FIG. 10 that the electronic device 101 may sequentially perform operation 1001 to operation 1015. However, this is only an example. For example, the operations may be performed in a different order, or at the same time. A part of the operations may be performed by the electronic device 101 and the other parts may be performed by an external device. For example, operation 1001 and operation 1015 may be performed by the electronic device 101 and operation 1003 to operation 1013 may be performed by a server.

According to an example embodiment, a method performed by an electronic device may include: receiving an input based on a process for a memory included in the electronic device or connected to the electronic device being executed, analyzing a domain association for at least one or more domains included in the electronic device or operatively connected to the electronic device in response to the input, collecting at least one hint defined in the at least one or more domains, identifying a common parameter for the collected at least one hint, reconstructing the hint using the identified common parameter, and providing response data including the reconstructed hint using the user interface.

According to an example embodiment, the method performed by an electronic device may further include: receiving a voice signal included in the input using a sound model included in the electronic device or operatively connected to the electronic device and causing the sound model to be learned using a learning algorithm.

According to an example embodiment, the method performed by an electronic device may further include selecting a domain for providing the hint based on the domain association.

According to an example embodiment, the method performed by an electronic device may further include: executing a domain in response to the user input, storing the input and information about the domain, generating a relational model using the stored information, and analyzing the domain association using the relational model.

According to an example embodiment, the method performed by an electronic device may further include learning the domain association using the relational model.

According to an example embodiment, the method performed by an electronic device may further include: analyzing a domain association for a domain based on at least one of a time and a place at which the domain is used with respect to the at least one or more domains included in the electronic device or connected to the electronic device.

According to an example embodiment, the method performed by an electronic device may further include: analyzing a domain association for a domain based on an order relationship in which the domain is used with respect to at least one or more domains included in the electronic device or connected to the electronic device.

According to an example embodiment, the method performed by an electronic device may further include: identifying identical parameters capable of being changed in the collected hint and extracting a common parameter from the identical parameters.

According to an example embodiment, the method performed by an electronic device may further include extracting the common parameter based on the collected hint.

According to an example embodiment, the method performed by an electronic device may further include extracting the common parameter based on the user input.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a user interface comprising interface circuitry;
at least one processor comprising processing circuitry; and
a memory operatively connected to the at least one processor,
wherein the memory stores instructions that, when executed by the at least one processor, cause the electronic device to:
receive a user input through the user interface;
determine a first domain corresponding to a user intent extracted from the user input;
analyze, by the at least one processor, a domain association between the first domain and a plurality of domains included in the electronic device or operatively connected to the electronic device based at least in part on information stored in the memory and associated with a time and a place at which the first domain and the plurality of domains are used by the electronic device to generate a domain association model, wherein the information includes information about an execution order in which the first domain is used with respect to the plurality of domains, information on whether the first domain and the plurality of domains are previously used together, and/or information on whether the first domain and the plurality of domains are previously used within an adjacent time period or at same location;
determine at least one domain associated with the first domain from among the plurality of domains based on the domain association model, wherein the at least one domain is different from the first domain;
identify at least one hint defined in the at least one domain, wherein the at least one hint represents a recommended command associated with a function executable in the at least one domain and includes a plurality of parameters;
identify a first parameter included in the user input and at least one second parameter of the plurality of parameters included in the at least one hint, which correspond to each other;
determine a common parameter for the at least one hint from among the first parameter and the at least one second parameter based on the user intent;
reconstruct the at least one hint into a reconstructed hint by changing the at least one second parameter included in the at least one hint to the determined common parameter; and
provide response data including the reconstructed hint, using the user interface.

2. The electronic device of claim 1, further comprising:
a sound model operatively connected to the processor,
wherein the instructions, when executed by the at least one processor, cause the electronic device to:
receive a voice signal included in the user input using the sound model; and
cause the sound model to be learned using a learning algorithm.

3. The electronic device of claim 1, wherein the instructions, when executed by the at least one processor, cause the electronic device to:
execute the first domain in response to the user input;
store information about the user input and the first domain;
generate the domain association model based at least in part on the stored information about the user input and the first domain; and
analyze the domain association using the domain association model.

4. The electronic device of claim 3, wherein the instructions, when executed by the at least one processor, cause the electronic device to:
train the domain association model using the information about the user input and the first domain.

5. The electronic device of claim 1, wherein the instructions, when executed by the at least one processor, cause the electronic device to:
determine the common parameter based on the identified at least one hint.

6. A method performed by an electronic device, the method comprising:
receiving a user input;
determining a first domain corresponding to a user intent extracted from the user input;
analyzing a domain association between the first domain and a plurality of domains included in the electronic device or operatively connected to the electronic device based at least in part on information stored in the memory and associated with a time and a place at which the first domain and the plurality of domains are used by the electronic device to generate a domain association model, wherein the information includes information about an execution order in which the first domain is used with respect to the plurality of domains, information on whether the first domain and the plurality of domains are previously used together, and/or information on whether the first domain and the plurality of domains are previously used within an adjacent time period or at same location;
determining at least one domain associated with the first domain from among the plurality of domains based on the domain association model, wherein the at least one domain is different from the first domain;
identifying at least one hint defined in the at least one domain, wherein the at least one hint represents a recommended command associated with a function executable in the at least one domain and includes a plurality of parameters;
identifying a first parameter included in the user input and at least one second parameter of the plurality of parameters included in the at least one hint, which correspond to each other;
determining a common parameter for the at least one hint from among the first parameter and the at least one second parameter based on the user intent;
reconstructing the at least one hint into a reconstructed hint by changing the at least one second parameter included in the at least one hint to the determined common parameter; and
providing response data including the reconstructed hint, using the user interface.

7. The method of claim 6, further comprising:
receiving a voice signal included in the user input using a sound model included in the electronic device or operatively connected to the electronic device; and
causing the sound model to be learned using a learning algorithm.

8. The method of claim 6, further comprising:
executing the first domain in response to the user input;
storing information about the user input and the first domain;
generating the domain association model based at least in part on the stored information about the user input and the first domain; and
analyzing the domain association using the domain association model.

9. The method of claim 8, further comprising:
training the domain association model using the information about the user input and the first domain.

10. The method of claim 6, further comprising:
determining the common parameter based on the at least one hint.

* * * * *